(12) United States Patent
Suzuki et al.

(10) Patent No.: US 9,092,662 B2
(45) Date of Patent: Jul. 28, 2015

(54) PATTERN RECOGNITION METHOD AND PATTERN RECOGNITION APPARATUS

(75) Inventors: Takashi Suzuki, Kawasaki (JP);
Katsuhiko Mori, Kawasaki (JP);
Hiroshi Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 266 days.

(21) Appl. No.: 12/970,712

(22) Filed: Dec. 16, 2010

(65) Prior Publication Data

US 2011/0158540 A1 Jun. 30, 2011

(30) Foreign Application Priority Data

Dec. 24, 2009 (JP) ................................. 2009-293201

(51) Int. Cl.
*G06K 9/46* (2006.01)
*G06K 9/00* (2006.01)

(52) U.S. Cl.
CPC ........ *G06K 9/00288* (2013.01); *G06K 9/00281* (2013.01)

(58) Field of Classification Search
CPC .......... G06K 9/00288; G06K 9/00221; G06K 9/00268; G06K 9/00228; G06K 9/00302; G06K 9/46; G06K 2009/00221; G06K 2009/00328
USPC ........... 382/118, 154, 195, 190, 224; 707/737
See application file for complete search history.

(56) References Cited

U.S. PATENT DOCUMENTS

| | | | |
|---|---|---|---|
| 5,760,346 A | 6/1998 | Kobayashi et al. | |
| 5,761,087 A | 6/1998 | Yoshimura et al. | |
| 5,862,049 A | 1/1999 | Sato et al. | |
| 6,225,986 B1 | 5/2001 | Sato et al. | |
| 6,239,792 B1 | 5/2001 | Yanagisawa et al. | |
| 6,288,711 B1 | 9/2001 | Tanaka et al. | |

(Continued)

FOREIGN PATENT DOCUMENTS

| | | |
|---|---|---|
| JP | 2000-090191 A | 3/2000 |
| JP | 4161659 | 8/2008 |

(Continued)

OTHER PUBLICATIONS

Matsugu, M.; Mori, K.; Ishii, M.; Mitarai, Y.; , "Convolutional spiking neural network model for robust face detection," Neural Information Processing, 2002. ICONIP '02. Proceedings of the 9th International Conference on , vol. 2, No., pp. 660-664 vol. 2, Nov. 18-22, 2002.*

(Continued)

*Primary Examiner* — Stephen R Koziol
*Assistant Examiner* — Shaghayegh Azima
(74) *Attorney, Agent, or Firm* — Fitzpatrick, Cella, Harper & Scinto

(57) ABSTRACT

A pattern recognition apparatus that recognizes a data attribute of input data calculates correlation values of feature quantities of corresponding local patterns between the input data and dictionary data for each of a plurality of dictionary data prepared for each data attribute, combines, for each data attribute, the calculated correlation values of local patterns of each dictionary datum to acquire a set of correlation values of each data attribute, integrates correlation values included in each set of correlation values of each data attribute to calculate a similarity of the input data for each data attribute, and identifies the data attribute of the input data based on the calculated similarity.

11 Claims, 12 Drawing Sheets

(56) References Cited

U.S. PATENT DOCUMENTS

| | | |
|---|---|---|
| 6,611,258 B1 | 8/2003 | Tanaka et al. |
| 6,714,665 B1 * | 3/2004 | Hanna et al. ............ 382/117 |
| 7,039,233 B2 | 5/2006 | Mori et al. |
| 7,532,745 B2 * | 5/2009 | Inoue ...................... 382/118 |
| 7,577,297 B2 | 8/2009 | Mori et al. |
| 7,590,266 B2 * | 9/2009 | Kato et al. ............... 382/118 |
| 7,856,122 B2 * | 12/2010 | Enomoto .................. 382/115 |
| 7,881,524 B2 | 2/2011 | Matsugu et al. |
| 7,912,253 B2 | 3/2011 | Suzuki et al. |
| 8,396,911 B2 * | 3/2013 | Oguro ...................... 708/230 |
| 2003/0133599 A1 * | 7/2003 | Tian et al. ................ 382/118 |
| 2003/0142854 A1 * | 7/2003 | Cho et al. ................. 382/118 |
| 2004/0042644 A1 * | 3/2004 | Yuasa et al. .............. 382/118 |
| 2006/0074653 A1 * | 4/2006 | Mitari et al. ............. 704/240 |
| 2006/0115157 A1 * | 6/2006 | Mori et al. ............... 382/190 |
| 2007/0047775 A1 * | 3/2007 | Okubo ..................... 382/118 |
| 2007/0071288 A1 * | 3/2007 | Wu et al. .................. 382/118 |
| 2007/0177807 A1 * | 8/2007 | Enomoto .................. 382/224 |
| 2008/0095447 A1 * | 4/2008 | Fukuyama et al. ....... 382/209 |
| 2008/0144891 A1 * | 6/2008 | Hwang et al. ............ 382/118 |
| 2008/0219516 A1 * | 9/2008 | Suzuki et al. ............. 382/118 |
| 2009/0089235 A1 | 4/2009 | Torii et al. |
| 2009/0157707 A1 | 6/2009 | Ito et al. |
| 2009/0220156 A1 * | 9/2009 | Ito et al. .................. 382/201 |
| 2009/0232364 A1 * | 9/2009 | Hosoi ....................... 382/118 |
| 2009/0324060 A1 | 12/2009 | Sato et al. |
| 2010/0054550 A1 * | 3/2010 | Okada ...................... 382/118 |
| 2010/0205177 A1 * | 8/2010 | Sato et al. ................ 707/737 |
| 2010/0329556 A1 | 12/2010 | Mitarai et al. |
| 2011/0090246 A1 * | 4/2011 | Matsunaga ............... 345/620 |
| 2011/0243398 A1 * | 10/2011 | Suzuki et al. ............. 382/118 |
| 2012/0002867 A1 * | 1/2012 | Ishiyama et al. .......... 382/154 |
| 2012/0051646 A1 * | 3/2012 | Suzuki et al. ............. 382/190 |

FOREIGN PATENT DOCUMENTS

| | | | |
|---|---|---|---|
| JP | 2009-211178 A | | 9/2009 |
| WO | WO 2009/047983 | * | 4/2009 |

OTHER PUBLICATIONS

A. Pentland, B. Moghaddam, and Starner, "View-Based and Modular Eigenspaces for Face Recognition," Proc. IEEE Conf. Computer Vision and Pattern Recognition, 1994, pp. 84-91.*

U.S. Appl. No. 12/899,387, filed Oct. 6, 2010, Applicants: Masami Kato, et al.

U.S. Appl. No. 12/986,051, filed Jan. 6, 2011, Applicant: Hiroshi Sato.

Matsugu, et al., "Convolutional Spiking Neural Network Model for Robust Face Detection", International Conference on Neural Information Processing, Nov. 2002.

Kaneda, et al., "Automatic Expression Recognition System Using Face Detection Convolutional Neural Network", The Second Forum on Information Technology, 2003.

Kinoshita, et al., "Face Feature Point Detection and Head Posture Estimation by 3D Model Fast Fitting", MIRU, 2008.

Japanese Office Action dated Sep. 30, 2013 in Japanese Patent Application No. 2009-293201.

* cited by examiner

| | |
|---|---|
| ⋮ | ⋮ |
| REGISTRANTp | $S^{p}_{11'}, \ldots, S^{p}_{1i}, S^{p}_{21} \ldots, S^{p}_{K_{P}i}$ |
| REGISTRANT p+1 | $S^{p+1}_{11}, \ldots, S^{p+1}_{1n}, S^{p+1}_{21} \ldots, S^{p+1}_{K_{P+1}i}$ |
| ⋮ | |

CORRELATION VALUE TABLE — 901

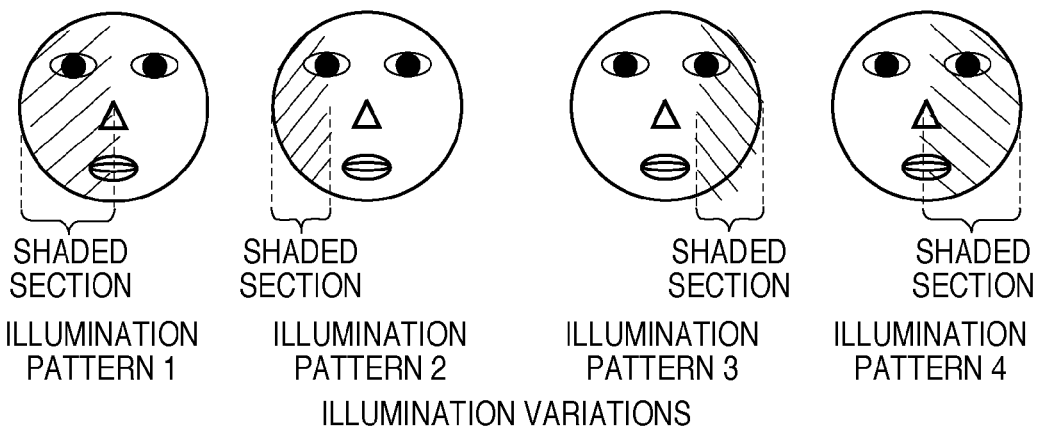
FIG. 14A ILLUMINATION VARIATIONS
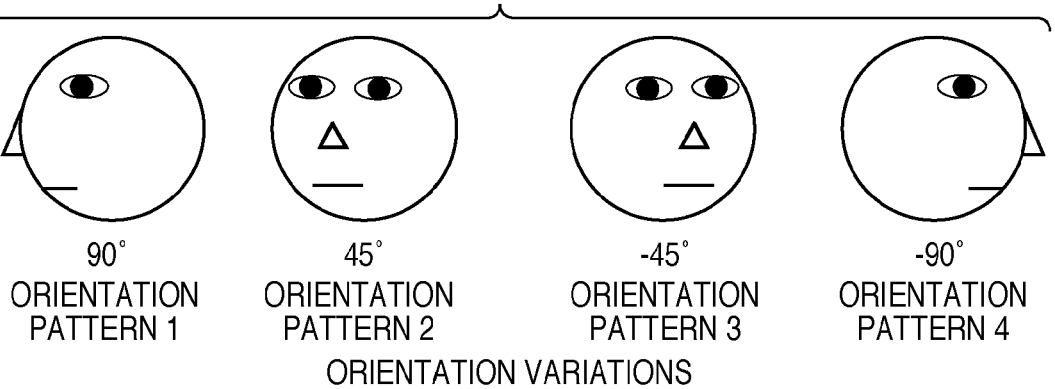
FIG. 14B ORIENTATION VARIATIONS
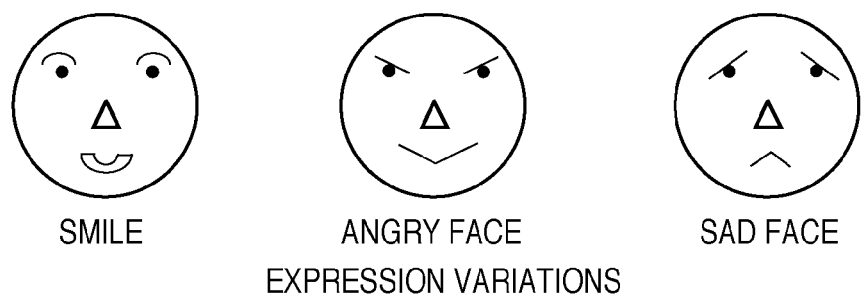
FIG. 14C EXPRESSION VARIATIONS
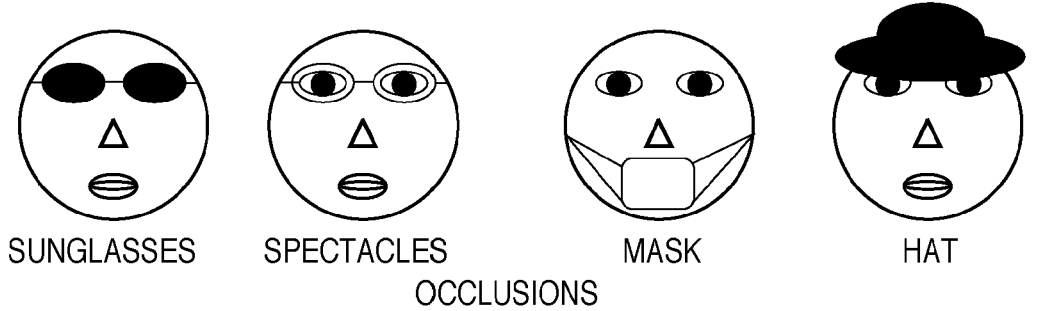
FIG. 14D OCCLUSIONS

PATTERN RECOGNITION METHOD AND PATTERN RECOGNITION APPARATUS

BACKGROUND OF THE INVENTION

1. Field of the Invention

The present invention relates to a pattern recognition method and a pattern recognition apparatus for recognizing a specific pattern such as a face and a person.

2. Description of the Related Art

There is a pattern recognition technique for detecting and identifying a predetermined pattern from an input pattern. Pattern recognition technique has progressed alongside performance increases in computers, and recently a system of detecting a face in an image in real time has started to come out. There is also a known face recognition technique that detects a face area in an image and verifying whom the person in the face area is. The accuracy of the face recognition technique is significantly affected by illumination conditions, such as oblique light, as well as face orientation variations, expression variations, and occlusions. The variations are not independent from each other. Therefore, the realization of a robust face recognition algorithm for the variations is difficult.

Consequently, techniques for handling the variations are proposed. The configuration of Japanese Patent Laid-Open No. 2000-90191 (hereinafter, "Document 1") includes a plurality of inverse transformers that remove variation factors in an input image to perform variation-robust face recognition. The inverse transformers execute processes of removing face orientations, inclinations, and face misalignments (inverse transform of transformation). There are identifiers at the latter parts of the inverse transformers, and the identifiers execute matching processes of the output of the inverse transformers and dictionary data and output identification results. Ultimately, the result with maximum output is extracted from the plurality of identification results, and the result is set as the final identification result. Furthermore, an example of the processes of removing the variations includes a perturbation method.

Japanese Patent No. 4161659 (hereinafter, Document 2) proposes a method of obtaining similarities between a plurality of corresponding local areas of an input image and a registered image and performing recognition based on an integrated similarity obtained from several upper similarities. The upper similarities are obtained by a threshold process of a threshold dynamically determined by other plurality of similarities. Therefore, the threshold process removes the similarities between unclear areas due to variation factors. Ultimately, recognition resistant to the variations is attained by outputting an identification result using the integrated similarity.

However, the inverse transform process of Document 1 may delete feature quantities indicating individual differences, and the recognition accuracy may be affected. The execution of an inverse transformation process for removing all predicted variation factors from the input image increases the processing cost. The similarity of the local area in Document 2 tends to be high if variations, such as expressions and illumination variations, are similar, even if the persons in the input image and the dictionary image are different. Therefore, the integrated similarity is obtained by integrating the results of local areas with similar variations, and the recognition accuracy may be reduced.

SUMMARY OF THE INVENTION

The present invention has been made in view of the foregoing problems, and an embodiment of the present invention provides a pattern recognition method and a pattern recognition apparatus for preventing the reduction of recognition accuracy caused by variations in illumination, face orientation, expression, etc. and controlling the increase of processing cost.

According to one aspect of the present invention, there is provided a pattern recognition apparatus that recognizes a data attribute of input data, the apparatus comprising: a correlation value calculation unit configured to calculate correlation values of feature quantities of corresponding local patterns between the input data and dictionary data for each of a plurality of dictionary data prepared for each data attribute and configured to combine, for each data attribute, the calculated correlation values of local patterns of each dictionary datum to acquire a set of correlation values of each data attribute; a similarity calculation unit configured to integrate correlation values included in each set of correlation values of each data attribute to calculate a similarity of the input data for each data attribute; and an identification unit configured to identify the data attribute of the input data based on the similarity calculated by the similarity calculation unit.

Furthermore, according to another aspect of the present invention, there is provided a pattern recognition method by a pattern recognition apparatus that recognizes a data attribute of input data, the method comprising: a correlation value calculation step of calculating correlation values of feature quantities of corresponding local patterns between the input data and dictionary data for each of a plurality of dictionary data prepared for each data attribute and combining, for each data attribute, the calculated correlation values of local patterns of each dictionary datum to acquire a set of correlation values of each data attribute; a similarity calculation step of integrating the set of correlation values included in each set of correlation values of each data attribute to calculate a similarity of the input data for each data attribute; and an identification step of identifying the data attribute of the input data based on the similarity calculated in the similarity calculation step.

Further features of the present invention will become apparent from the following description of exemplary embodiments with reference to the attached drawings.

BRIEF DESCRIPTION OF THE DRAWINGS

FIGS. 14A to 14D are diagrams showing an example of a variation pattern according to the third embodiment.

DESCRIPTION OF THE EMBODIMENTS

Hereinafter, embodiments of the present invention will be described with reference to the attached drawings. Specific embodiments of individual recognition based on image information will be described below. More specifically, image data is handled as an input image, and dictionary data, to which solid-body identification information indicating a person in the image data is added as a data attribute, is used to describe an image processing apparatus that identifies a person in input data. However, the input data is not limited to image information in the present invention, and for example, it is obvious to those skilled in the art that the present invention can also be applied to time-series signal information or frequency information.

First Embodiment

Pattern Recognition Apparatus

Figure 1:
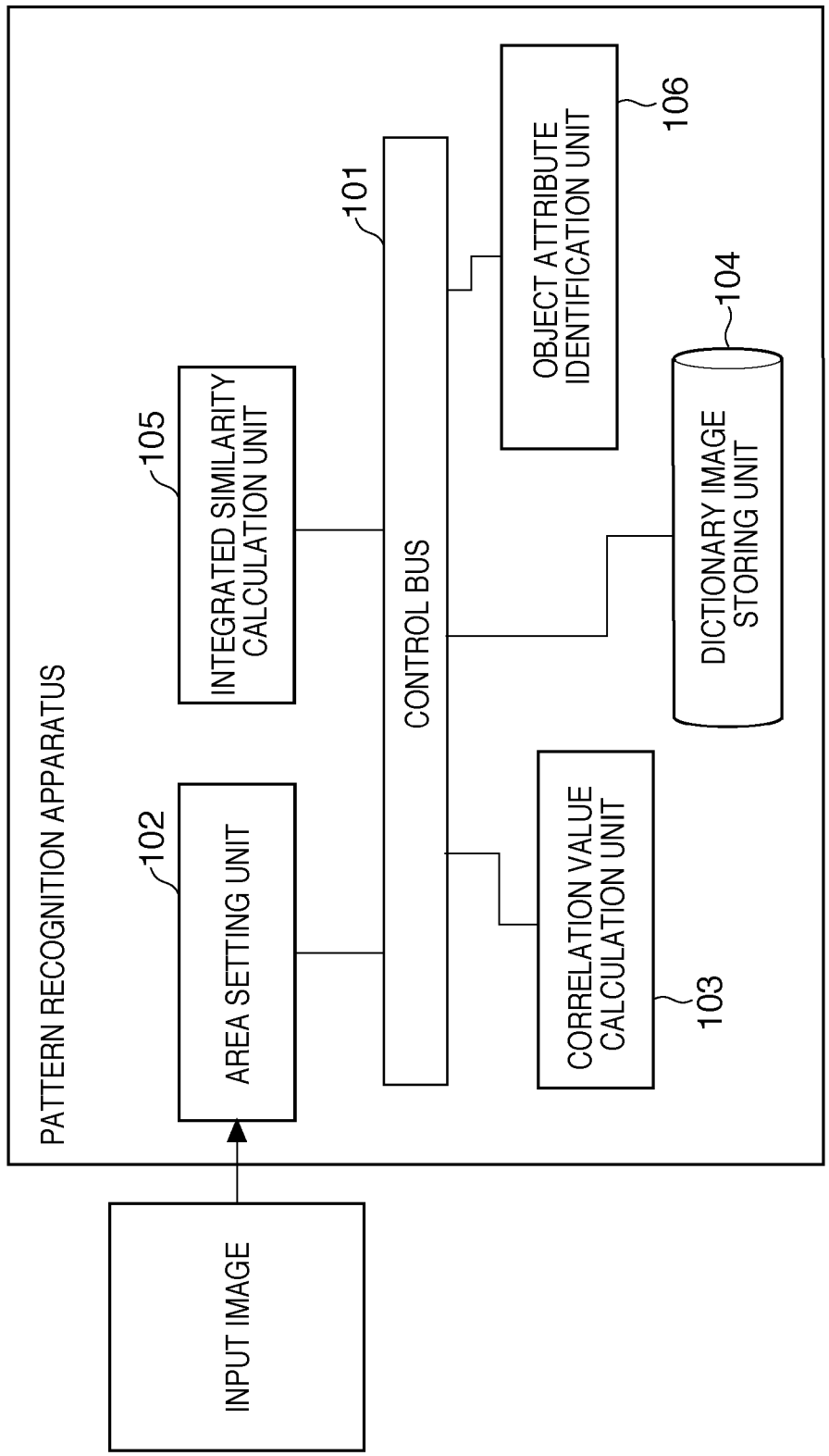
FIG. 1 is a diagram showing a pattern recognition apparatus.

FIG. 1 is a functional block diagram of a pattern recognition apparatus. Hereinafter, details of the blocks will be described. A control bus 101 controls input and output of the functional blocks. An area setting unit 102 acquires an input image inputted from the outside and sets a local area for extracting a feature quantity of the acquired input image. Details of a method of setting the local area, etc., will be described later. A general method can be used as the method of acquiring the image. For example, an imaging element such as a CCD may be incorporated into a pattern recognition apparatus, and the image may be acquired through the imaging element. A correlation value calculation unit 103 calculates correlation values between the input image and dictionary images acquired in advance for each local area set by the area setting unit 102. Details of the correlation value calculation method in the correlation value calculation unit 103 will be described later. Constituted by an external storage, such as an HDD, a dictionary image storing unit 104 adds attribute data to the dictionary image as dictionary data and stores the image. An integrated similarity calculation unit 105 integrates a plurality of correlation values of each local area obtained by the correlation value calculation unit 103 to calculate an integrated similarity. The calculation method of the integrated similarity by the integrated similarity calculation unit 105 will be described later. An object attribute identification unit 106 identifies an object attribute of an object included in the image inputted to the area setting unit 102 based on the integrated similarity obtained by the integrated similarity calculation unit 105. A specific identification method of the object attribute identification unit 106 will be described later. The area setting unit 102, the correlation value calculation unit 103, the integrated similarity calculation unit 105, and the object attribute identification unit 106 are constituted by, for example, dedicated arithmetic circuits or firmware.

[Pattern Recognition Method]

Figure 2:
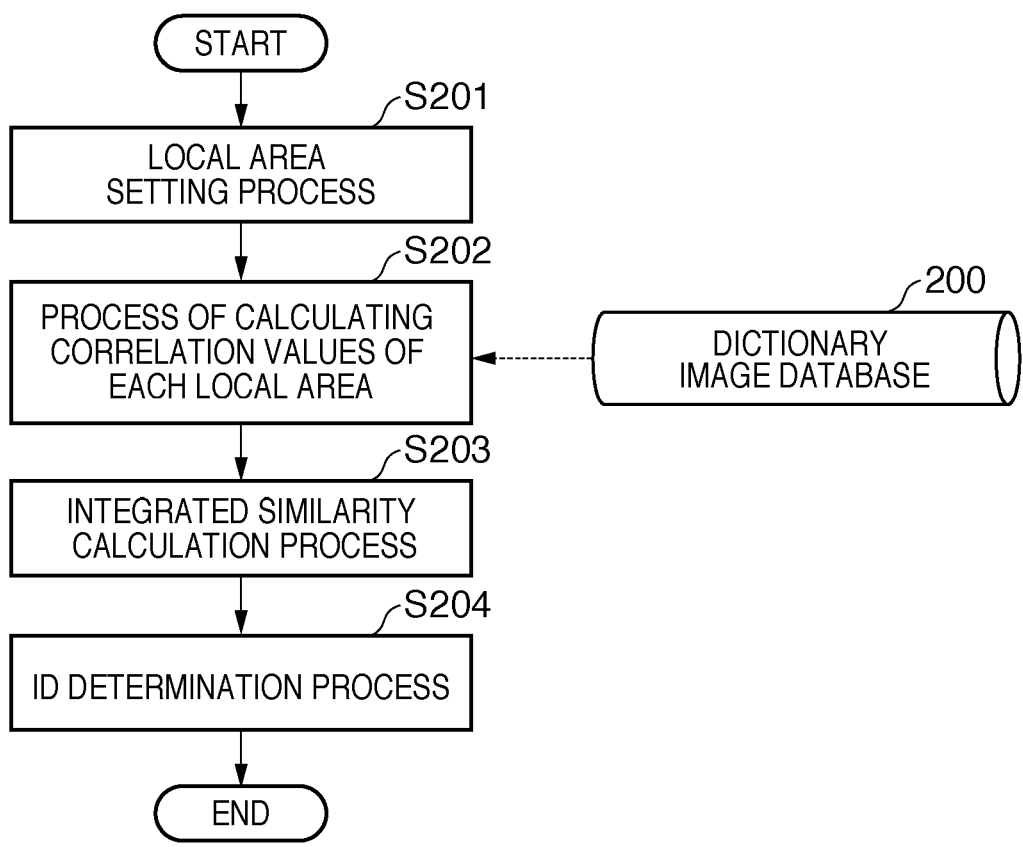
FIG. 2 is a basic processing flow chart of a first embodiment.

A pattern recognition method according to the first embodiment will be described in detail with reference to a flow chart of FIG. 2. The area setting unit 102 first executes a local area setting process of determining a location of a local area relative to the input image for calculating correlation values (S201). A general method can be used to determine the location of the local area. For example, in the present embodiment, a general detection method, specifically, a face detection method, is used to detect a face from the input image to set the local area in a cut-out normalized image based on the detection result. Therefore, original point coordinates of the cut-out normalized image are set as a reference point to set the local area.

Figure 3:
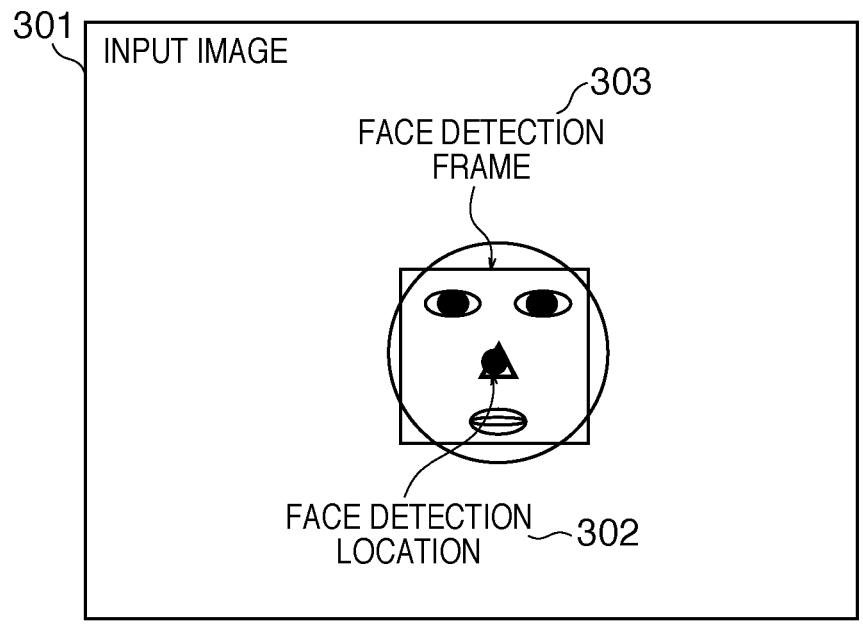
FIG. 3 is a diagram showing a face detection frame according to the first embodiment.

A general method can be used to create the cut-out normalized image. For example, in the present embodiment, an image is cut out from an input image 301 based on a face detection location 302 outputted by face detection, and the image is enlarged or reduced to set the horizontal width to an arbitrary value based on the vertical width and the horizontal width of a face detection frame 303, as shown in FIG. 3. M. Matsugu, K. Mori, et. al, "Convolutional Spiking Neural Network Model for Robust Face Detection", 2002, International Conference On Neural Information Processing (ICONIP02) can be referenced as a known example of the face detection. The location detection result of eye feature points can be used to determine the vertical width and the horizontal width of the face detection frame 303. Specifically, twice the distance between the eyes can be determined as the horizontal width and the vertical width of the face detection frame 303. Kaneda, Mori, Mitarai, and Matsugu, "Automatic Expression Recognition System Using Face Detection Convolutional Neural Network", The Second Forum on Information Technology, 119-121 (2003) can be referenced as a known example of the organ location detection of the eye feature points, etc.

Figure 4:
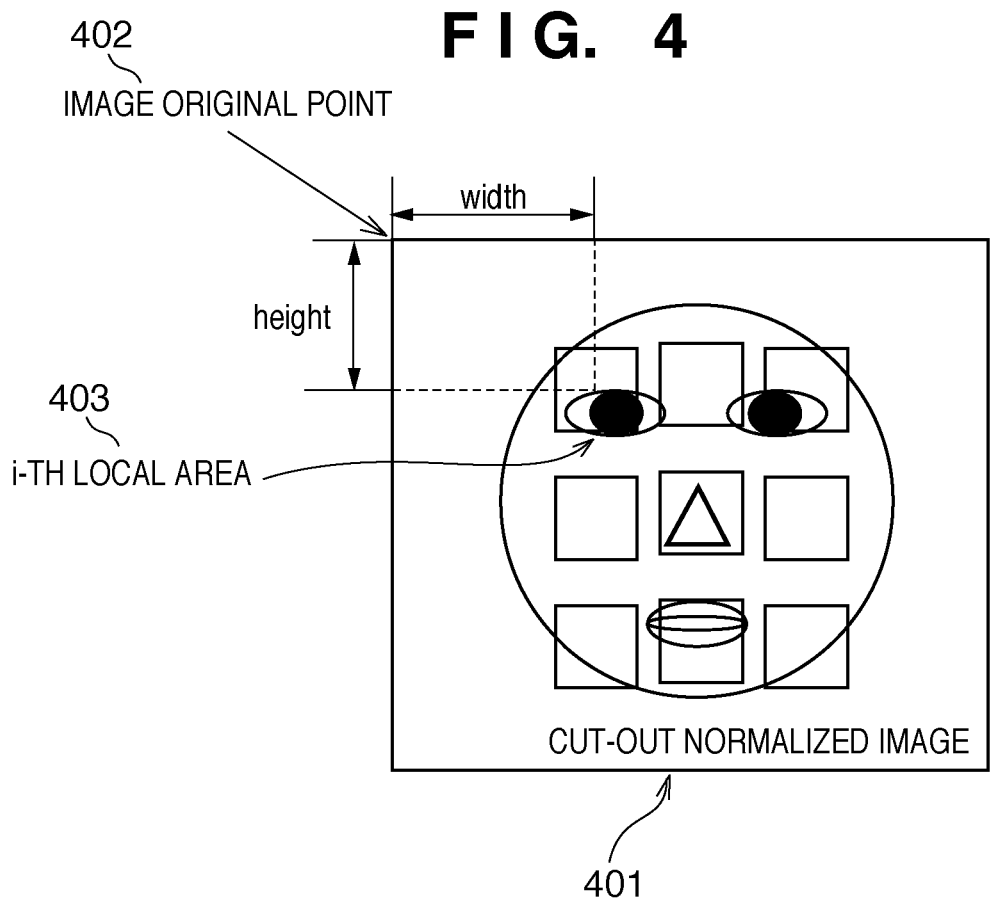
FIG. 4 is a diagram showing a setting method of a local area according to the first embodiment.

FIG. 4 shows a state of setting a local area in a cut-out normalized image 401. The face area of the cut-out normalized image 401 exists at approximately the same location in any face image if the face size outputted by the face detection is accurate. The local area is determined based on an image original point 402 of the cut-out normalized image. More specifically, the location of an i-th local area 403 is a distance from the original point in the horizontal direction and the vertical direction of the cut-out normalized image 401 from the image original point 402. The foregoing is the processing content in the local area setting process (S201) of FIG. 2.

FIG. 2 will be described again. In a process of calculating correlation values of each local area (S202), the correlation value calculation unit 103 calculates correlation values between the i-th local area set in S201 and a corresponding i-th local area of a dictionary image recorded in a dictionary image database 200. The dictionary image database 200 is a database of dictionary images stored in the dictionary image storing unit 104. The following formula denotes the correlation value calculation process.

$$S_{ki}^p = \frac{(I_i \cdot I_{ki}^p)}{|I_i||I_{ki}^p|} \quad (1)$$

Figure 5:
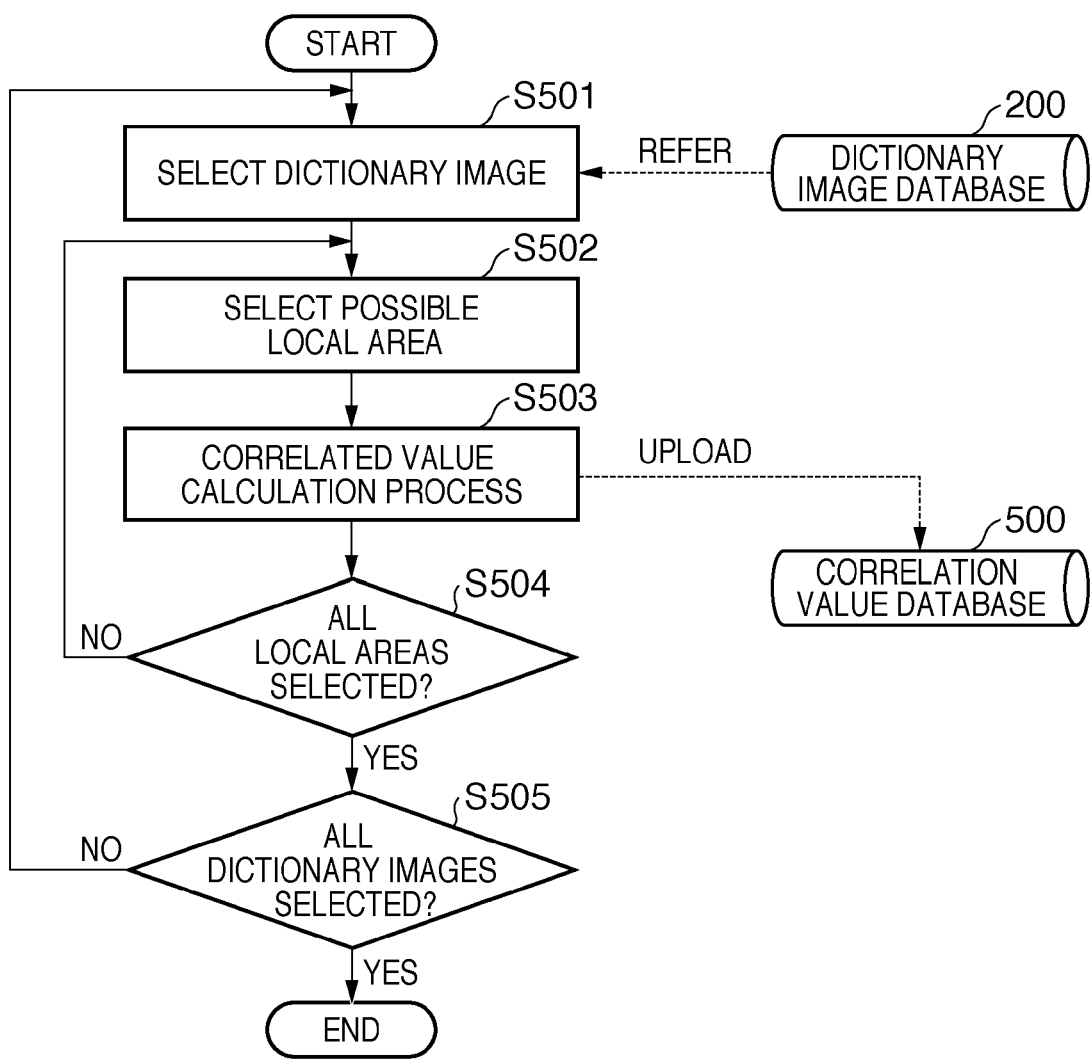
FIG. 5 is a flow diagram showing a correlation value calculation method according to the first embodiment.

In the formula (1), $S_{ki}^p$ denotes correlation values of local patterns of the i-th local area in a k-th dictionary image of a registrant p and the i-th local area of the input image. Furthermore, $I_i$ denotes a vector including luminance values of the pixels of the i-th local area of the input image, $I_{ki}^p$ denotes a vector including luminance values of the pixels of the i-th local area in the k-th dictionary image of the registrant p. Although the correlation values of the formula (1) are calculated based on the luminance values, the correlation values may be calculated based on other factors. More specifically, the correlation values may be calculated based on the output result of a predetermined filter computation. The correlation values denote similarities, and the correlation values may be obtained by a method other than the formula (1). For example, the Euclid distance between $I_i$ and $I_{ki}^p$ can be used. In the process of calculating correlation values of each local area (S202), the correlation value calculation indicated by the formula (1) is executed for all registered images. Details of the process will be described with reference to the processing flow chart of FIG. 5.

Figure 6:
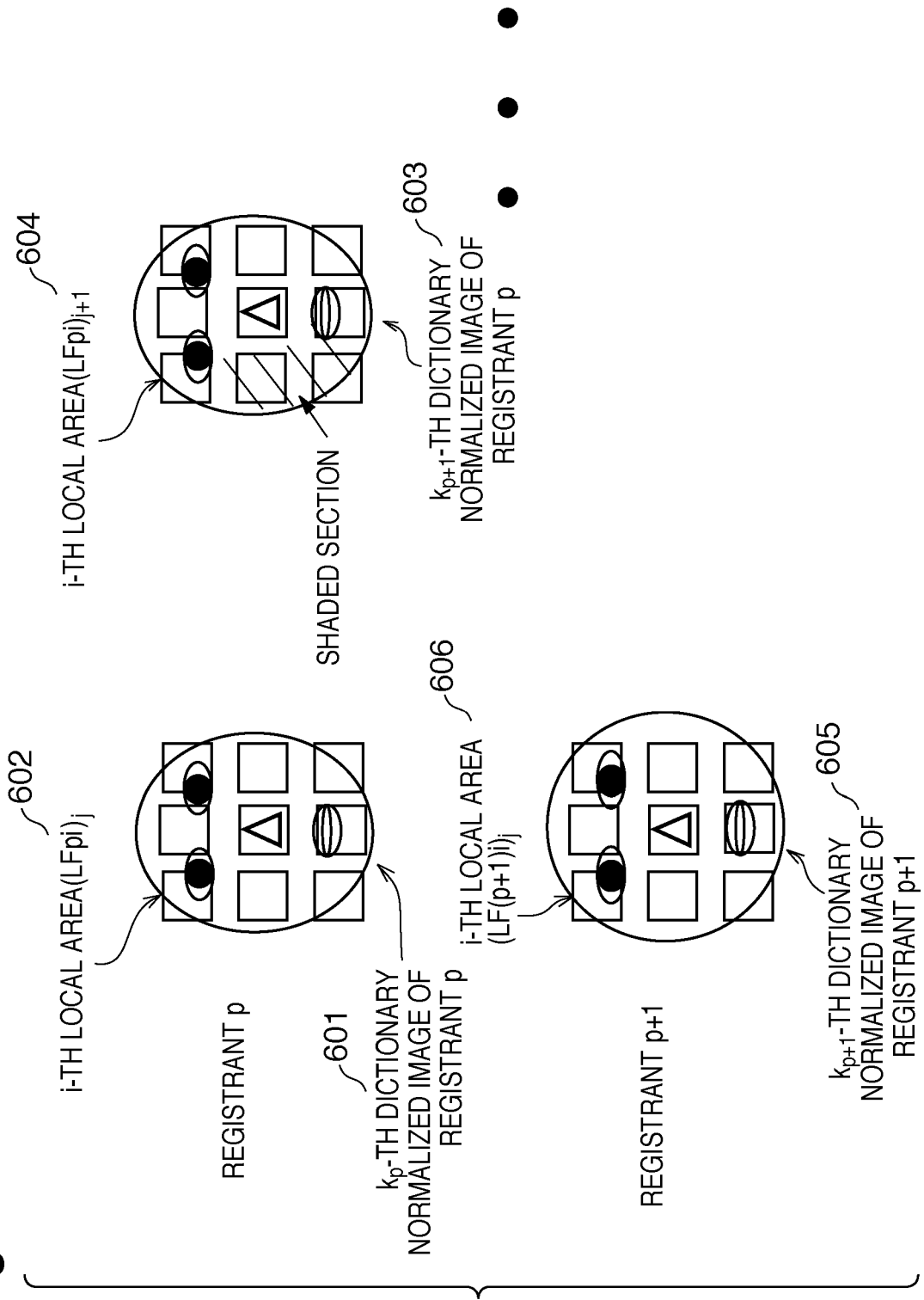
FIG. 6 is a diagram showing dictionary images according to the first embodiment.

The correlation value calculation unit 103 first selects the k-th dictionary image related to the registrant p from the dictionary image database 200 (S501). Details of the dictionary image database 200 will be described. As shown in FIG. 6, the dictionary image database 200 manages a plurality of images of a plurality of registrants that are acquired at different timings and that are stored in the dictionary image storing unit 104. For example, a $k_p$-th dictionary normalized image 601 and a $k_{p+1}$ dictionary normalized image 603 are recorded in relation to the registrant p. Obviously, the number of dictionary images related to the registrant p is not limited to two as shown in FIG. 6, and any number of dictionary images may exist. The dictionary normalized image denotes an image of a registrant that is standardized in a predetermined size like the cut-out normalized image of FIG. 4. The dictionary normalized image 601 and the dictionary normalized image 603 are not exactly the same images, and there are differences, such as the dictionary normalized image 603 has shaded sections as shown in FIG. 6. A $k_{p+1}$-th dictionary normalized image 605 related to a registrant p+1 is also recorded in the dictionary image database. The number of dictionary normalized image in relation to the registrant p+1 is not limited to one, either, and a plurality of images may exist. The dictionary image database may be configured not to store images, but to record the feature quantity of each local area which is the unit of dictionary normalized image. In that case, the database needs to associate the i-th local area of the $k_p$ dictionary normalized image of the registrant p with the feature quantity represented by the luminance value. In a dictionary image selection process (S501), a process of selecting a target dictionary normalized image from the dictionary image database 200 as shown in FIG. 6 is executed.

In a possible local area selection process (S502), the correlation value calculation unit 103 executes a process of referencing the i-th local area of the normalized dictionary image selected in S501. The reference method of the local area is the same as the area setting method of the local area setting process (S201), and the description will not be repeated. In a correlation value calculation process (S503), the correlation value calculation unit 103 calculates the correlation values between the luminance values in the i-th local area of the dictionary image referenced in S502 and the luminance values in the corresponding i-th local area of the input image. The correlation value calculation method is performed using the formula (1). The calculated correlation values are sequentially recorded in a correlation value database 500.

In S504, the correlation value calculation unit 103 checks whether all local areas set in the dictionary image selected S501 are referenced. If not all local areas are referenced, the process moves again to S502, and if all local areas are referenced, the process moves to S505. In S505, the correlation value calculation unit 103 determines whether processing of all images recorded in the dictionary image database 200 is completed. The process of the processing flow chart shown in FIG. 5 ends if processing of all images is completed. If processing of all images is not completed, the process returns to S501, and the next dictionary image is selected to repeat the process.

FIG. 2 will be described again. In an integrated similarity calculation process (S203), the integrated similarity calculation unit 105 executes a calculation process of an integrated similarity. The integrated similarity denotes a value in which a plurality of correlation values of each local area of each registrant are combined (integrated correlation value). The calculation method of the integrated similarity will be described with reference to the conceptual diagram of FIG. 7 and the processing flow chart of FIG. 8.

Figure 7:
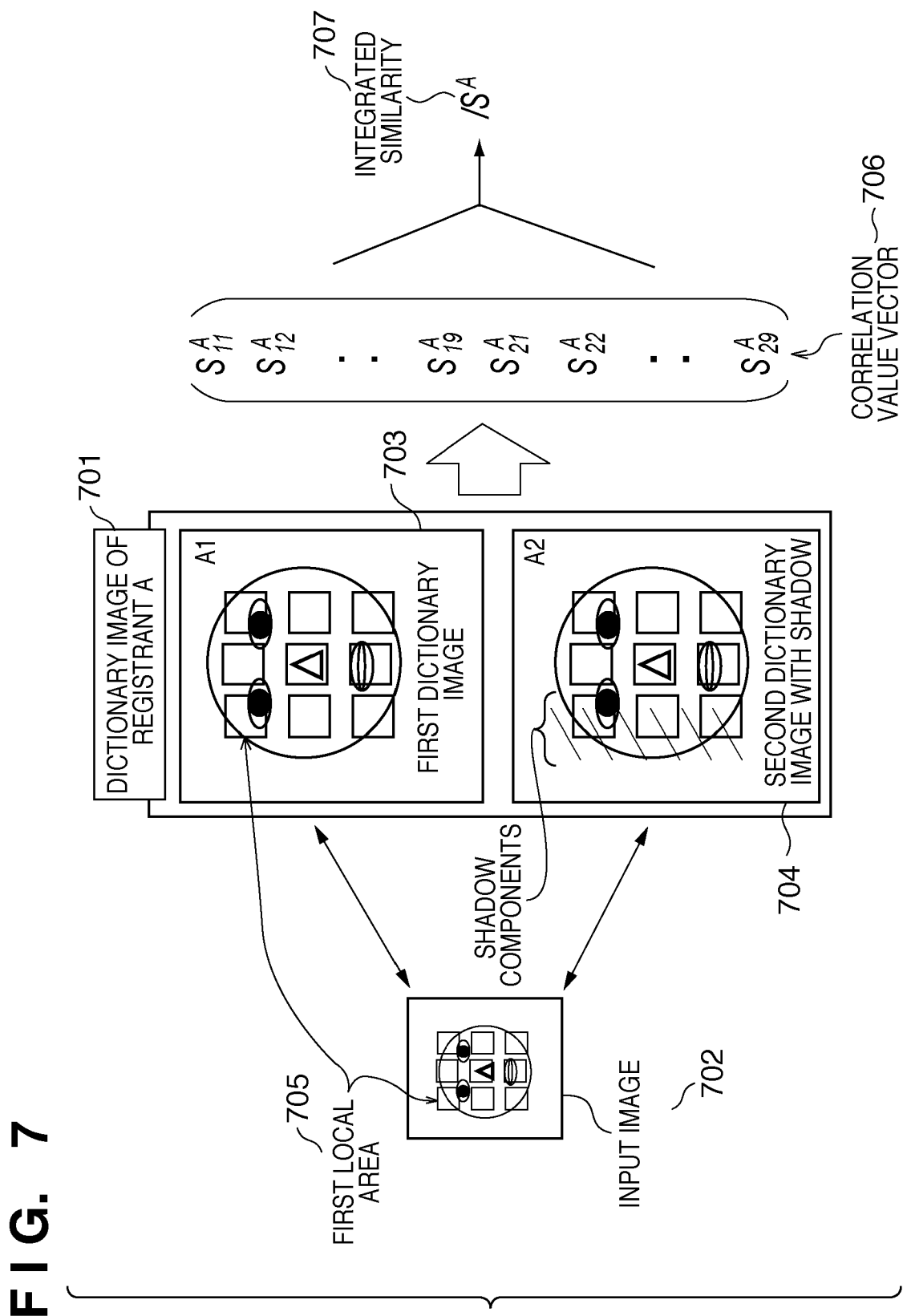
FIG. 7 is a flow diagram showing an integration method according to the first embodiment.

FIG. 7 is a conceptual diagram of the integrated similarity calculation process according to the present embodiment. It is assumed that the dictionary image 701 including the registrant A as the data attribute is a dictionary image related to the registrant A and that there are two dictionary images in FIG. 7. Although there is one registrant in FIG. 7, there may be persons other than the registrant A. In that case, the same process as shown in FIG. 7 is applied to the registered images other than the registrant A. Three or more dictionary images may be registered for one registrant, and the identification accuracy can be further improved by registering a plurality of dictionary images with various variations for one registrant. As described in the process of FIG. 5 (process of calculating correlation values of each local area), correlation values of the feature quantities of corresponding local areas are calculated in an input image 702 and a first dictionary image 703. More specifically, the correlation value calculation unit 103 calculates a correlation value $S_{11}^A$ of a luminance value of the first local area 705 based on the formula (1). Similarly, correlation values are calculated in corresponding local areas of the first dictionary image 703 and a second dictionary image 704 with shadow, and a correlation value vector 706, which is a set of correlation values, of each data attribute (registrant) is obtained. An integrated similarity 707 is obtained from the correlation value vector 706. Hereinafter, the calculation method of the integrated similarity will be described with reference to the processing flow chart of FIG. 8.

Figures 8, 9:
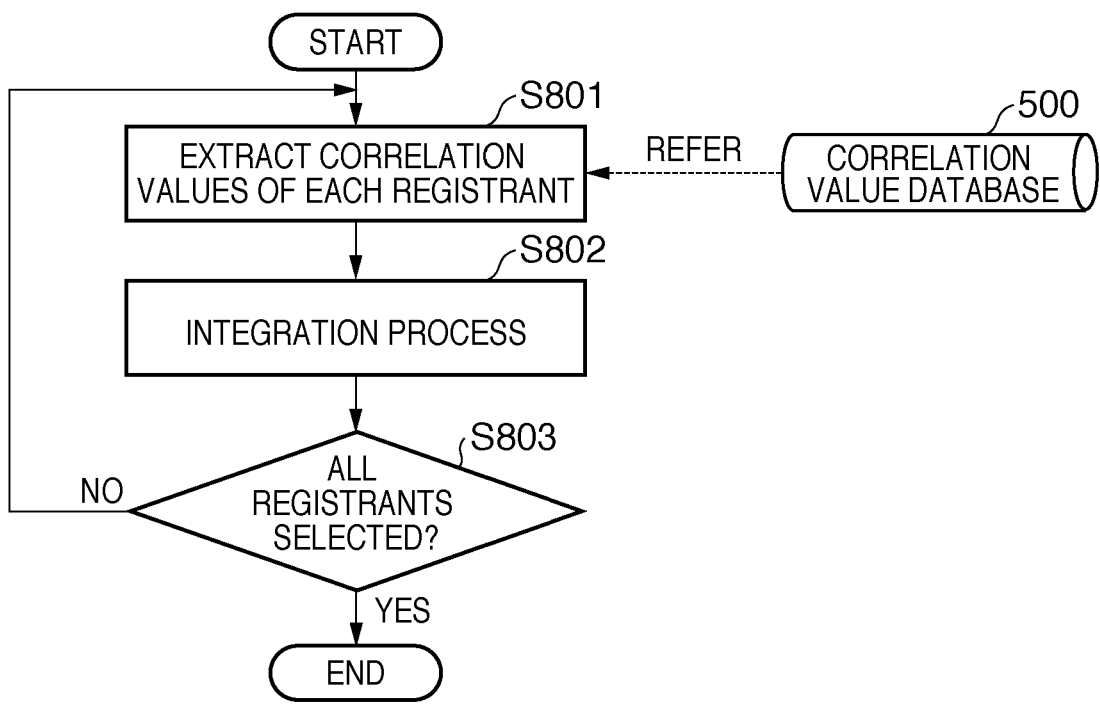
FIG. 8 is a diagram showing a summary of the integration method according to the first embodiment.
FIG. 9 is a diagram showing a correlation value table according to the first embodiment.

FIG. 8 is a processing flow chart of the integrated similarity calculation method. In a process of extracting correlation values of each registrant (S801) of FIG. 8, the integrated similarity calculation unit 105 extracts all correlation values related to the registrant p from the correlation value database 500 of FIG. 5. As shown in FIG. 9, the correlation value database 500 is a table 901 that holds correlation values $S_{kpi}^p$ obtained from the dictionary images related to the registrant p. More specifically, the process of extracting correlation values of each registrant (S801) extracts $k_p \times i$ ("the number of registered images"×"the number of local areas per image") correlation values $S_{kpi}^p$ related to the registrant p from the correlation value table 901.

In an integration process (S802), the integrated similarity calculation unit 105 applies a threshold process to the sorting result of the correlation values extracted in S801. The integrated similarity calculation unit 105 then calculates an average value of the correlation values greater than a threshold and sets the average value as an integrated similarity related to the registrant p. The following formula denotes the integrated similarity.

$$IS^p = \overline{S}_{k_p i}^p \text{ where } S_{k_p i}^p > Th \quad (2)$$

In the formula (2), $IS^p$ denotes an integrated similarity related to the registrant p. Furthermore, Th denotes a threshold, and the formula (2) indicates that an average value of correlation values greater than Th is calculated. The method of obtaining the integrated similarity is not limited to the method in the present embodiment, and an average value, a weighted average value, or a maximum value of all correlation values may serve as the integrated similarity. A general method can be used for the calculation method of the threshold Th, and for example, the value can be dynamically obtained by applying a predetermined bias to a fixed value arbitrarily set by the developer or to the average value of all correlation values of each registrant.

FIG. 8 will be described again. In S803, the integrated similarity calculation unit 105 determines whether the integrated similarities calculated in S801 and S802 are calculated for all registrants. If the integrated similarity calculation process of all registrants is finished, the processing flow chart of FIG. 8 ends. The foregoing is the summary of the integrated similarity calculation method.

FIG. 2 will be described again. In an ID determination process (S204), the object attribute identification unit 106 determines which registrant the input image is based on the integrated similarity. The following formula denotes the determination method.

$$\underset{p}{\operatorname{argmax}}(IS^p) \qquad (3)$$

In the formula (3), $IS^p$ denotes the integrated similarity related to the registrant p. The maximum value of the integrated similarity $IS^p$ is searched, and it is determined that the input image is an image of registrant p which provided the maximum value in the determination process of the present step.

As described, in the first embodiment, the correlation values of the corresponding local areas of the input image and the dictionary image are obtained from a plurality of dictionary images including various variations to obtain the integrated similarity of a specific registrant. As a result, there is an advantage that individual recognition that is not easily affected by variations, such as illumination variations of the input image, is possible.

Second Embodiment

A second embodiment will be described. The basic flow of the second embodiment is substantially the same as the first embodiment, and the calculation method in the integrated similarity calculation process (S203) is different. The calculation method of the integrated similarity of the second embodiment will be described with reference to a conceptual diagram of FIG. 10 and a processing flow chart of FIG. 11.

Figure 10:
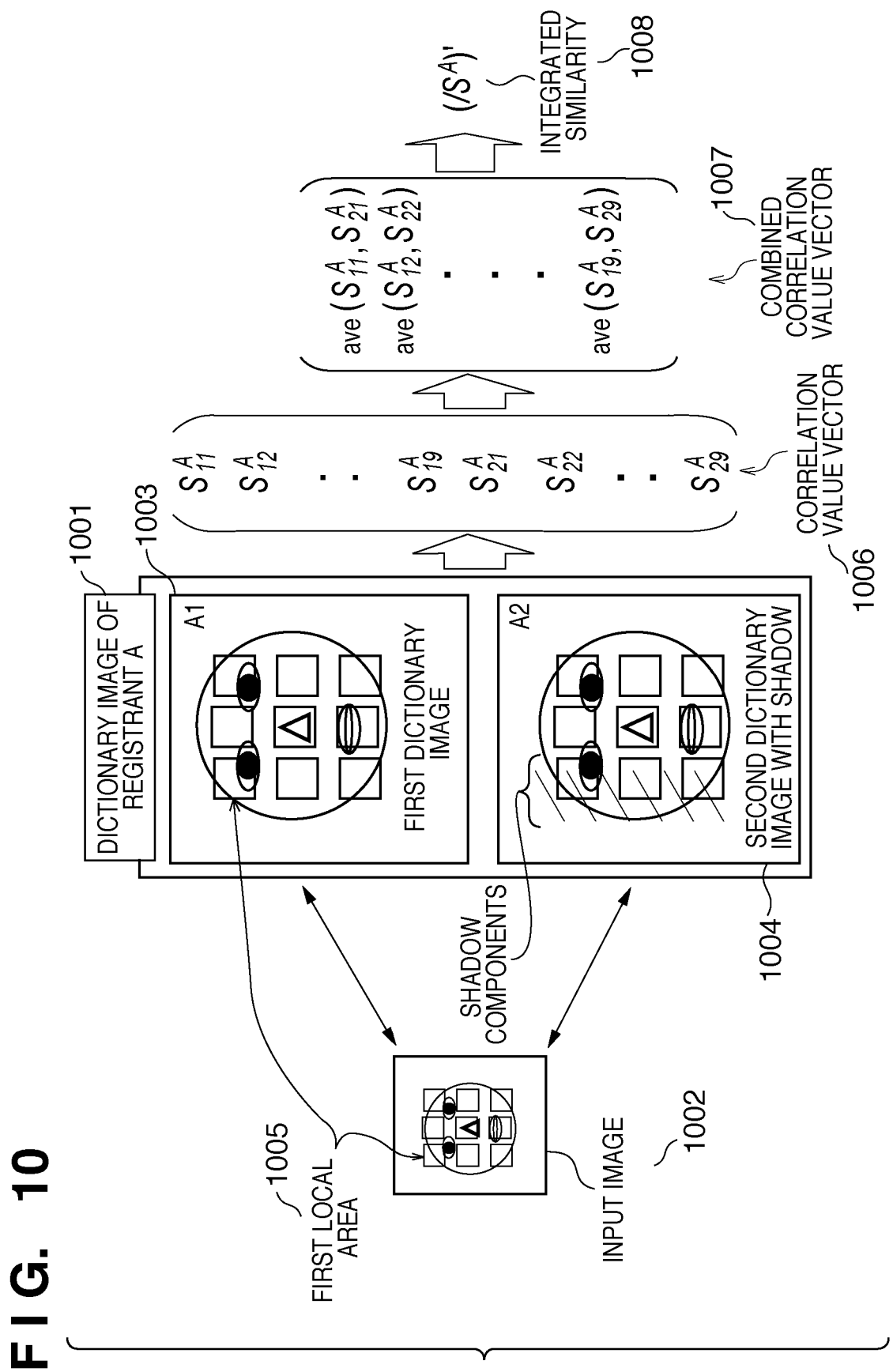
FIG. 10 is a diagram showing an integration method according to a second embodiment.

Dictionary images 1001 of the registrant A of FIG. 10 denote dictionary images related to the registrant A, and it is assumed that there are two dictionary images in FIG. 10. Although there is one registrant in FIG. 10, there may be persons other than the registrant A. In that case, the same process as shown in FIG. 10 is applied to the registered images other than the registrant A. As described, three or more dictionary images may be registered for one registrant. In the present embodiment, the dictionary images 1001 of the registrant A include a first dictionary image 1003 and a second dictionary image 1004 with shadow. The first dictionary image 1003 is an image without variations, such as face orientation and shadows. On the other hand, the second dictionary image 1004 with shadow is an image including shadow components indicated by oblique lines. Like the first dictionary image, an input image 1002 is an image without variations, such as face orientation and shadows.

As described in the first embodiment (FIG. 7), the correlation value calculation unit 103 calculates the correlation values of the feature quantities of corresponding local areas of the input image 1002 and the first dictionary image 1003 as well as the correlation values of the feature quantities of corresponding local areas of the input image 1002 and the second dictionary image 1004. The calculated correlation values become like a correlation value vector 1006 described by vector. The integrated similarity calculation unit 105 (S203) obtains a combined correlation value vector 1007 of each local area from the correlation value vector 1006. The combined correlation value vector 1007 of each local area is constituted by, for example, average values of correlation values $S_{1n}^A$ and $S_{2n}^A$ of n-th local areas between the first dictionary image 1003 and the input image 1002 and between the second dictionary image 1004 and the input image 1002. An integrated similarity 1008 is obtained from the combined correlation value vector 1007, and an individual is identified based on the integrated similarity. The foregoing is the summary of the calculation method of the integrated similarity. Details of the calculation method of the integrated similarity according to the second embodiment will be described with reference to the processing flow chart of FIG. 11.

In a process of extracting a correlation value of each registrant (S1101), the integrated similarity calculation unit 105 acquires correlation values calculated from a target registrant from the correlation value database 500. In a local area selection process (S1102), the integrated similarity calculation unit 105 selects a target local area from i local areas. It is assumed that the selected local area is an n-th local area. In a process of calculating combined correlation values of each local area (S1103), combined correlation values of the target local area are calculated based on the correlation values of the dictionary images of the target local area selected in S1102. The following formula denotes the combined correlation values of each local area.

$$CS_n^p = \overline{S}_{k_p n}^p \text{ where } S_{k_p n}^p > Th \qquad (4)$$

In the formula, $CS_n^p$ denotes the combined correlation value of the n-th local area selected in S1102 related to the registrant p. The combined correlation value is an average value of the correlation values $S_{k_p m}^p$ of the n-th local area greater than the predetermined threshold Th among all dictionary images related to the registrant p. If there is no value greater than Th, the combined correlation value is 0. The calculation method of the combined correlation value is not limited to the method described above, and an average, a weighted average, or a maximum value of all correlation values of the n-th local area may be used. In the formula, $k_p$ denotes the number of dictionary images of the registrant p. The obtained combined correlation value of the local area is pooled in a database not shown.

In S1104, the integrated similarity calculation unit 105 determines whether all possible local areas are selected. If all local areas are comprehensively selected, the process proceeds to S1105. If there are non-selected local areas, the process returns to S1102. One of the non-selected local areas is selected, and the process of calculating combined correlation values of each local area of S1103 is executed.

In an integrated similarity calculation process (S1105), the integrated similarity calculation unit 105 executes a process of organizing the combined correlation values of each local area calculated in S1103, specifically, $CS_n^p$ of a formula (4), for the registrant p. Specifically, the following formula denotes the process.

$$(IS^p)' = \overline{CS_n^p} \text{ where } CS_n^p > Th \qquad (5)$$

In the formula, $(IS^p)'$ denotes an integrated similarity obtained by integrating the combined correlation values of each local area for the registrant p. Based on the formula (5), the integrated similarity $(IS^p)'$ is an average value of the combined correlation values of each local area greater than the threshold Th. The method of obtaining the integrated similarity is not limited to the formula (5), and an average value or a maximum value of all combined correlation values may be set as the integrated similarity. The calculation method of the threshold Th may be a general method, and for example, the value can be dynamically obtained by applying a predetermined bias to a fixed value arbitrarily set by the developer or to the average value of all correlation values of each registrant. The values of Th in the formulas (4) and (5) may be the same values or different values.

FIG. 11 will be described again. In S1106, the integrated similarity calculation unit 105 determines whether the integrated similarity calculation process described in S1105 is executed for all registrants. If the integrated similarity calculation process is finished for all registrants, the integrated similarity calculation process shown in the flow chart of FIG. 11 ends. The foregoing is the summary of the integrated similarity calculation method according to the second embodiment.

The process of determining the registrant based on the integrated similarity calculated in the processing flow chart of FIG. 11 will be described. The processing flow is the same as the ID determination process of the first embodiment (S204), and the following formula denotes the process.

$$\underset{p}{\operatorname{argmax}}\{(IS^p)'\} \qquad (6)$$

Figure 11:
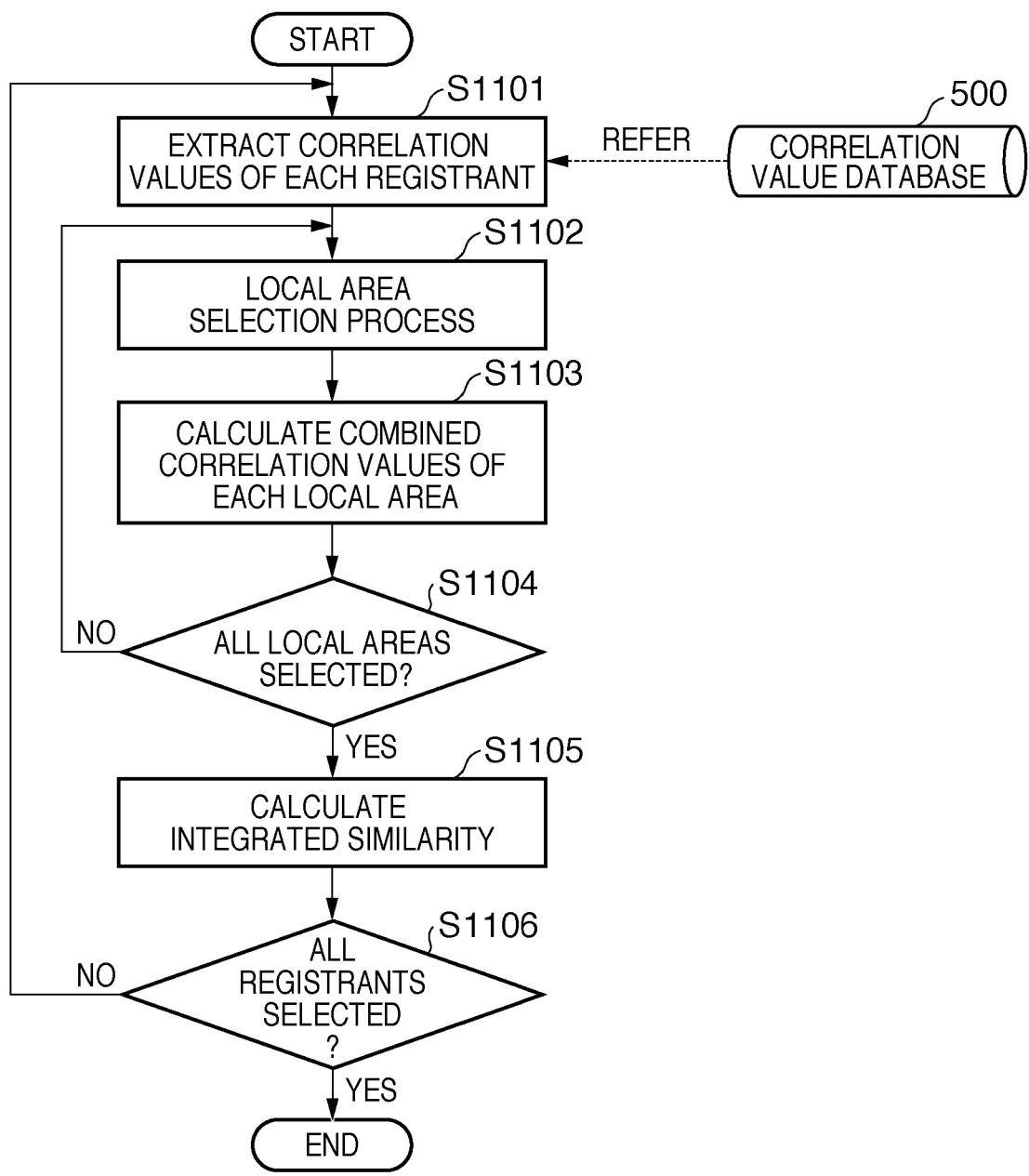
FIG. 11 is a flow diagram showing the integration method according the second embodiment.

In the formula (6), $(IS^p)'$ denotes an integrated similarity related to the registrant p calculated in the integrated similarity calculation process shown in FIG. 11. Based on the formula (6), the determination process is executed by searching the maximum value of the integrated similarity $(IS^p)'$. Then, it is determined that the input image is an image of a registrant p which provided the maximum value.

As described, according to the second embodiment, there is an advantage of preventing the calculation of the integrated similarity from the correlation values of the local areas that exist, for example, around the left eye and that include the same location information by implementing the combining process of the similarities of each local area. Therefore, the integrated similarity can be calculated from the correlation values of the local areas uniformly distributed over the entire face. The instability of the recognition accuracy due to individual determination using only local areas with large correlation values can be eliminated.

Third Embodiment

A third embodiment will be described. The basic flow of the third embodiment is substantially the same as the first embodiment. The difference is that the local area used to calculate the integrated similarity is dynamically changed based on the difference in visibility between the input image and the registered images. Details of the third embodiment will be described with reference to FIGS. 12, 13, and 14A to 14D.

Figure 12:
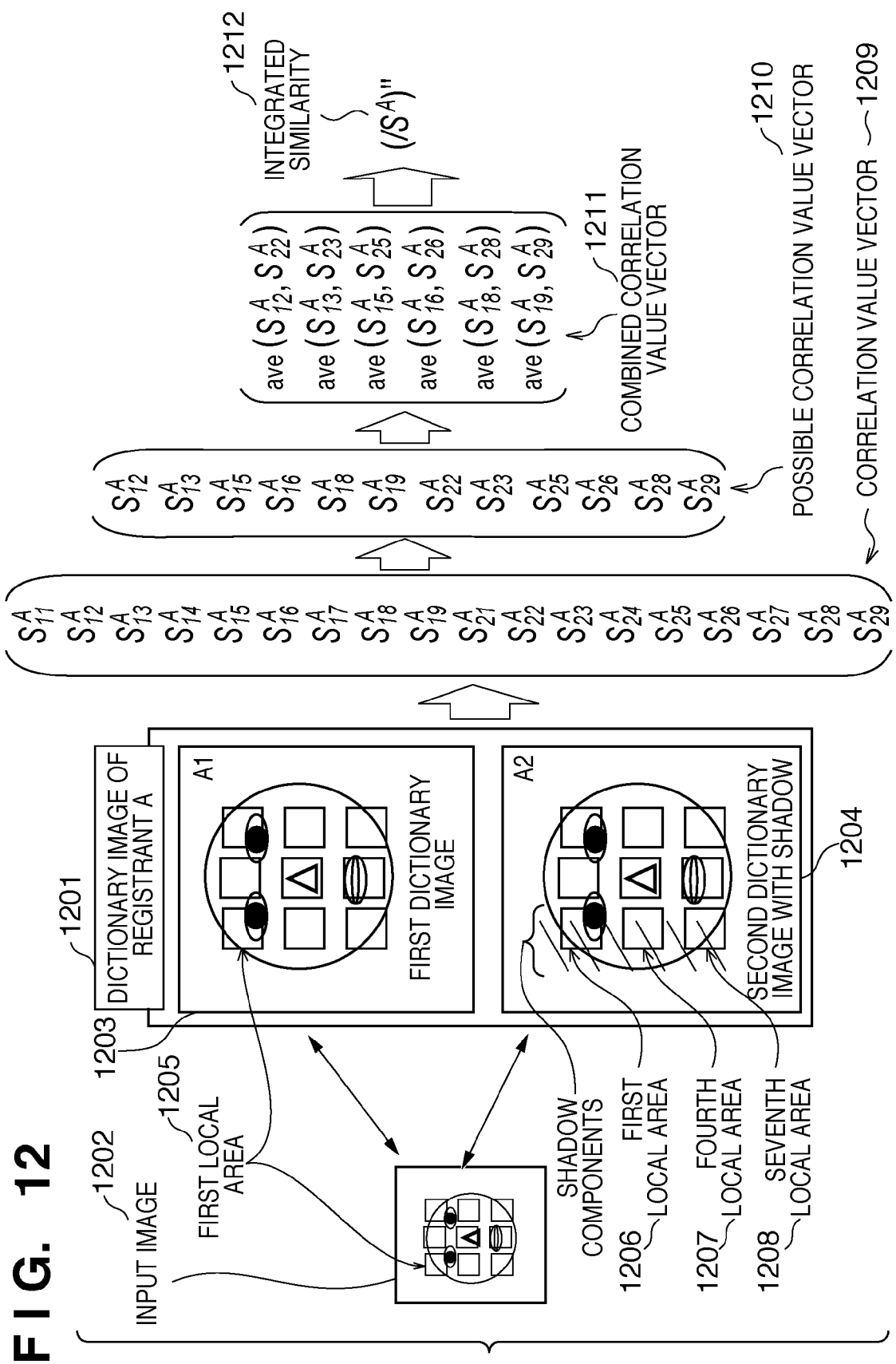
FIG. 12 is a diagram showing an integration method according to a third embodiment.
Figure 13:
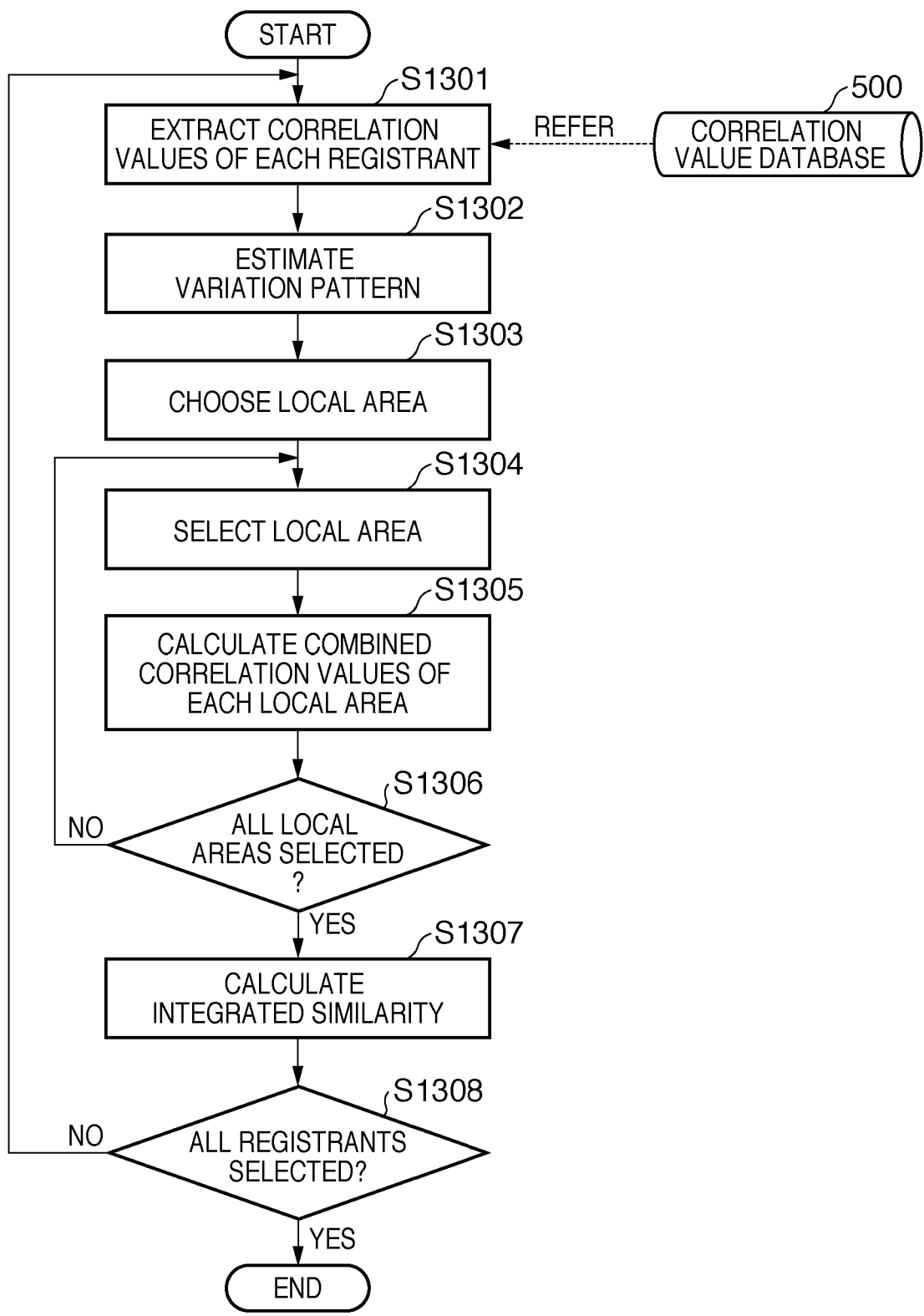
FIG. 13 is a flow diagram showing the integration method according to the third embodiment.

FIG. 12 is a conceptual diagram showing a summary of the third embodiment, and FIG. 13 is a processing flow chart showing details of the process. The summary of the present embodiment will be described with reference to FIG. 12. Dictionary images 1201 of the registrant A of FIG. 12 denote dictionary images related to the registrant A, and it is assumed that there are two dictionary images in FIG. 12. Although there is one registrant in FIG. 12, there may be persons other than the registrant A. In that case, the same process as shown in FIG. 12 is applied to the registered images other than the registrant A. The number of dictionary images related to one registrant is not limited to two, and there may be three or more images. The dictionary images 1201 of the registrant A include a first dictionary image 1203 and a second dictionary image 1204 with shadow. The first dictionary image 1203 is an image without variations, such as face orientation and shadows. On the other hands, the second dictionary image 1204 is an image including shadow components indicated by oblique lines. A first local area 1206, a fourth local area 1207, and a seventh local area 1208 in the second dictionary image 1204 are local areas set at the shaded sections.

Like the first dictionary image 1203, the input image 1202 is an image without variations, such as face orientation and shadows. At this point, as described in FIG. 7, the correlation value calculation unit 103 calculates the correlation values of the feature quantities of corresponding local areas of the input image 1202 and the first dictionary image 1203 and correlation values of the feature quantities of corresponding local areas of the input image 1202 and the second dictionary image 1204. A correlation value vector 1209 describes the calculated correlation values by vector. A possible correlation value vector 1210 is obtained from the correlation value vector 1209. The possible correlation value vector 1210 is obtained by deleting, from the correlation value vector 1209, correlation values $S_{21}{}^A$, $S_{24}{}^A$, and $S_{27}{}^A$ obtained from the first local area 1206, the fourth local area 1207, and the seventh local area 1208 set at the shaded sections of the second dictionary image 1204, and correlation values $S_{11}{}^A$, $S_{14}{}^A$, and $S_{17}{}^A$ obtained from the first local area, the fourth local area, and the seventh local area of the first dictionary image 1203.

The correlation values deleted from the correlation value vector 1209 are selected based on the difference in the visibility between the input image 1202 and the first dictionary image 1203 or between the input image 1202 and the second dictionary image 1204. Compared to the input image 1202, the visibility of the second dictionary image 1204 is different because there are shadow components. Therefore, the correlation values obtained from the first local area 1206, the fourth local area 1207, and the seventh local area 1208 set at the shadow sections are affected by shadows, i.e. illumination variations, and the reliability of the values is low. Therefore, the correlation values $S_{21}{}^A$, $S_{24}{}^A$, and $S_{27}{}^A$ are deleted from the correlation value vector 1209. There is no particular reason for deleting the correlation values $S_{11}{}^A$, $S_{14}{}^A$, and $S_{17}{}^A$, but the values are deleted for convenience. Obviously, the correlation values $S_{11}{}^A$, $S_{14}{}^A$, and $S_{17}{}^A$, may be left. In that case, in a configuration of obtaining a combined correlation value vector 1211 based on the maximum values of corresponding local areas between the dictionary images, there is no need to obtain the maximum value of the combined correlation values of the first local area 1206, the fourth local area 1207, and the seventh local area 1208. Therefore, the combined correlation values are the correlation values $S_{11}{}^A$, $S_{14}{}^A$, and $S_{17}{}^A$. Ultimately an integrated similarity 1212 is obtained from the combined correlation value vector 1211. The object attribute identification unit 106 determines who the input image is based on the integrated similarity. The foregoing is the summary of the present embodiment. Details of the integrated similarity calculation process (S203) according to the third embodiment will be described with reference to the processing flow chart of FIG. 13.

In a process of extracting a correlation value vector of each registrant (S1301), the integrated similarity calculation unit 105 extracts the correlation value vector 1209 corresponding to the registrant p from the correlation value database 500 (however, A is changed to p in the correlation value vector). In a variation pattern estimation process (S1302), the integrated similarity calculation unit 105 estimates variation patterns of the input image and the dictionary images of the registrant p. The variation patterns (variation types) are patterns as shown in FIGS. 14A to 14D.

FIGS. 14A to 14D show the types of variations of subjects in images. In the present embodiment, four variation types are prepared, i.e., illumination variations of FIG. 14A, face orientation variations of FIG. 14B, expression variations of FIG. 14C, and occlusions 1404 of FIG. 14D. The illumination variations are constituted by illumination patterns 1 and 4 including the shading section at the left half or the right half of the face and illumination patterns 2 and 3 in which left or right one quarter of the face is the shaded section. The orientation variations are constituted by orientation patterns 1 and 4 that are side faces to the left and right and orientation patterns 2 and 3 facing ±45° to the left and right when the front side face is assumed to be 0°. The expression variations are constituted by a smile, an angry face, and a sad face. The occlusions are constituted by faces with sunglasses, spectacles, a mask, and a hat. In the variation pattern estimation process (S1302), the input image and the dictionary images are applied to the variation patterns shown in FIGS. 14A to 14D to determine the differences in the variations between the input image and the dictionary images. The patterns of the sunglasses and the spectacles of the occlusions may be handled as the same variations, because just about the density of the lenses of the spectacles is different. The variation patterns are not limited to the ones listed in FIGS. 14A to 14D. The foregoing are the details of the types of the variation patterns.

FIG. 13 will be described again. As described, in the variation pattern estimation process (S1302), the variations of the input image and the variation patterns of the dictionary images of the registrant p are estimated, and the differences are determined from the estimated variation patterns. The variation pattern estimation method is performed by a known technique. The following is a specific example. The orientation pattern is estimated using the result of 3D model fast fitting as in a known example, Kinoshita, et. al., "Face Feature Point Detection and Head Posture Estimation by 3D Model Fast Fitting", pp. 1324-1329, MIRU (2008). The 3D model is obtained by dimension reduction of a three-dimensional coordinate vector of a plurality of organ locations, such as the head of the eye and other organs, by use of PCA, etc. The 3D model and the input image are matched to estimate the face orientation from three-dimensional coordinates of the plurality of organ locations of the input image. The illumination variation pattern can be estimated, for example, as follows. More specifically, the resolution of the image is reduced, and a straight line connecting the nose and the mouth is set as a parting line to create histograms of the left face area and the right face area of the parting line. The histograms of the input image and the histograms of various illumination patterns acquired in advance are then matched. As for the expression variations, the shapes of feature points, such as the eyes and the mouth, can be extracted to estimate the expression from the shapes. Lastly, a model of spectacles or a hat may be obtained by statistical learning to estimate the occlusions based on the similarity with the obtained model. The variation pattern estimation method is not limited to the method described above, and other known techniques may be used. In the variation pattern estimation process (S1302) of FIG. 13, the variation pattern estimation process is used to estimate the variation patterns of the dictionary images in relation to the input image and the registrant p.

In a local area choosing process (S1303), the integrated similarity calculation unit 105 executes a process of selecting the correlation values to be removed from the correlation value vector extracted in S1301 in accordance with combinations of the variation patterns of the input image and the dictionary images estimated in S1302. More specifically, the local area selection process is a process of obtaining the possible correlation value vector 1210 described in FIG. 12. In the variation pattern estimation process (S1302), it is determined that there are shadow components in a second dictionary image 1304. On the other hand, there is no shadow in the input image. Therefore, correlation values with low reliability obtained from the local areas set at the locations with shadow are eliminated.

In the local area selection process (S1304), the integrated similarity calculation unit 105 selects a target local area from location areas, the number of which is i at the maximum. It is assumed that the selected local area is an n-th local area. The target local area is selected from the areas selected in S1304. Therefore, the first local area 1206, the fourth local area 1207, and the seventh local area 1208 shown in FIG. 12 are not possible selections in the local area selection process (S1304).

In a process of calculating combined correlation values of each local area (S1305), the integrated similarity calculation unit 105 calculates the combined correlation values of each target local area based on the correlation values (elements of the possible correlation value vector 1210 of FIG. 12) of the target local areas selected in S1304. The combined correlation values of each local area are expressed by the formula (4). The obtained combined correlation values of each local area are pooled in a database not shown. Although the combined correlation values of each local area are calculated by the method shown in the formula (4) in the present step, a weighted average value or a maximum value may be used.

In S1306, the integrated similarity calculation unit 105 determines whether all possible local areas are selected. If all local areas are comprehensively selected, the process moves to S1307. In an integrated similarity calculation process (S1307), the integrated similarity calculation unit 105 executes a process of organizing the combined correlation values of each local area calculated in S1305, specifically, $CS_n^p$ of the formula (4), for the registrant p. Specifically, the following formula denotes the process.

$$(IS^p)'' = \overline{CS_n^p} \text{ where } CS_n^p > Th \tag{7}$$

In the formula, $(IS^p)''$ denotes an integrated similarity obtained by integrating the combined correlation values of each local area for the registrant p. Based on the formula (5), the integrated similarity $(IS^p)''$ is an average value of the combined correlation values of each local area greater than a threshold Th. The method of obtaining the integrated similarity in the third embodiment is not limited to the formula (7), and an average value or a maximum value of the combined correlation values of all local areas may be set as the integrated similarity. A general method can be used for the calculation method of the threshold Th, and for example, the value can be dynamically obtained by applying a predetermined bias to a fixed value arbitrarily set by the developer or to the average value of all correlation values of each registrant. The correlation values are calculated for all local areas in the process to select the correlation values used to calculate the combined correlation values according to the estimated variation patterns. However, the local area, from which the correlation values are calculated, may be selected according to the estimated variation patterns. In that case, for example, the correlation values $S_{21}{}^A$, $S_{24}{}^A$, and $S_{27}{}^A$ in the correlation value vector 1209 are not calculated in FIG. 12.

FIG. 13 will be described again. In S1308, the integrated similarity calculation unit 105 determines whether the integrated similarity is calculated for all registrants. If the integrated similarity calculation process of all registrants is completed, the integrated similarity calculation process shown in the flow chart of FIG. 13 ends. The foregoing is the summary of the integrated similarity calculation method.

A process of determining the registrant will be described based on the integrated similarity calculated in the processing flow chart of FIG. 13. The flow of the process is the same as the ID determination process (S204) of the first embodiment, and the following formula denotes the process.

$$\operatorname*{argmax}_{p}\{(IS^p)''\} \quad (8)$$

In the formula (8), $(IS^p)''$ denotes the integrated similarity related to the registrant p calculated in the processing flow chart of FIG. 13. Based on the formula (8), the determination process is executed by searching the maximum value of the integrated similarity $(IS^p)''$. Then, it is determined that the input image is an image of the registrant p which provides the maximum value.

The foregoing is the summary of the third embodiment. According to the third embodiment, the variation pattern estimation can be implemented to control the dispersion of the correlation values due to the variations. There is an advantage that robust individual recognition is possible for the variations.

According to the present invention, the reduction in the recognition accuracy caused by variations in illumination, face orientation, expression, etc. can be prevented, and the increase in the processing cost can be controlled.

Although the embodiments have been described in detail, the present invention can be implemented as embodiments of a system, an apparatus, a method, a program a storage medium, etc. Specifically, the present invention may be applied to a system constituted by a plurality of devices or may be applied to an apparatus constituted by one device.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-293201, filed Dec. 24, 2009, which is hereby incorporated by reference herein in its entirety.

What is claimed is:

1. A pattern recognition apparatus that recognizes a class of an input object pattern, the apparatus comprising:
circuitry functioning as:
a correlation value calculation unit configured to calculate a correlation value between a feature quantity of each local area in the input object pattern and a feature quantity of a corresponding local area in each of registered object patterns in a dictionary in which at least one object pattern has been registered for each of predetermined classes and a plurality of object patterns have been registered for at least one of the predetermined classes;
a combining unit configured to combine, for each class of the predetermined classes, the correlation values calculated for respective registered object patterns which belong to that class with respect to each local area in the input object pattern;
an obtaining unit configured to obtain an integrated similarity of the input object pattern for each class of the predetermined classes by integrating the combined correlation values of a plurality of local areas for that class; and
an identification unit configured to identify a class of the input object pattern based on the integrated similarity for each class obtained by said obtaining unit.

2. The apparatus according to claim 1, further comprising:
an estimation unit configured to estimate a variation pattern in the input object pattern; and
a determination unit configured to determine a local pattern used for each dictionary datum based on the variation pattern of the input object pattern and a variation pattern of each dictionary datum, wherein
said combining unit calculates the similarity of the input object pattern for each class by integrating the set of correlation values of each dictionary datum corresponding to the local pattern to be used to acquire combined correlation values.

3. The apparatus according to claim 1, wherein the combined correlation value is an average value of only the correlation values over the threshold, a weighted average value of the correlation values, or a maximum value of the correlation values.

4. The apparatus according to claim 1, wherein said obtaining unit calculates an average value of the combined correlation values over the threshold, a weighted average value of the combined correlation values, or a maximum value of the combined correlation values for each set of combined correlation values of each class as the integrated similarity for the class.

5. The apparatus according to claim 2, wherein the variation pattern is at least one of variations in face orientation of a subject included in the object pattern, variations in illumination, variations in expression of the face, and occlusions of the face.

6. The apparatus according to claim 1, wherein the recognized class is individual identification information.

7. A pattern recognition method by a pattern recognition apparatus that recognizes a class of an input object pattern, the method comprising:
a correlation value calculation step of calculating a correlation value between a feature quantity of each local area in the input object pattern and a feature quantity of a corresponding local area in each of registered object patterns in a dictionary in which at least one object pattern has been registered for each of predetermined classes and a plurality of object patterns have been registered for at least one of the predetermined classes;

a combining step of combining, for each class of the predetermined classes, the correlation values calculated for respective registered object patterns which belong to that class with respect to each local area in the input object pattern;

an obtaining step of obtaining an integrated similarity of the input object pattern for each class of the predetermined classes by integrating the combined correlation values of a plurality of local areas for that class; and an identification step of identifying a class of the input object pattern based on the integrated similarity for each class obtained in said obtaining step.

8. A non-transitory computer-readable storage medium storing a computer program causing a computer to execute the steps of the pattern recognition method according to claim 7.

9. The apparatus according to claim 1, wherein the circuitry comprises a processor.

10. The apparatus according to claim 1, wherein the circuitry comprises dedicated arithmetic circuits or firmware.

11. The apparatus according to claim 3, wherein said obtaining unit calculates an average value of the combined correlation values over the threshold, a weighted average value of the combined correlation values, or a maximum value of the combined correlation values for each set of combined correlation values of each class as the integrated similarity for the class.

\* \* \* \* \*